Oct. 8, 1963 A. DE CALLATAY 3,106,388
SUSPENSION INSENSITIVE TO BRIEF FORCE APPLICABLE
TO VEHICLES AND ENGINE BEARERS
Filed Jan. 8, 1960 2 Sheets-Sheet 1
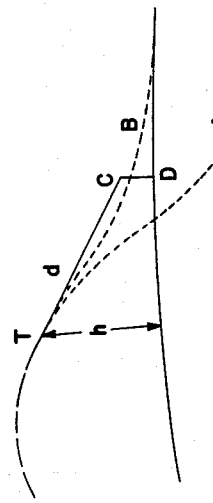
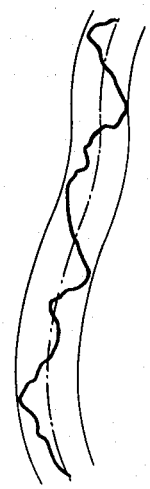
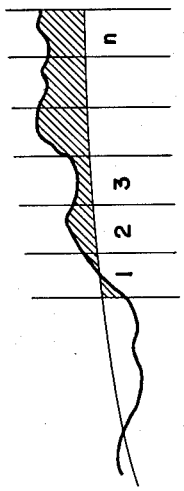
INVENTOR
ARMAND DE CALLATAY
BY Watson, Cole, Grindle & Watson
ATTORNEY

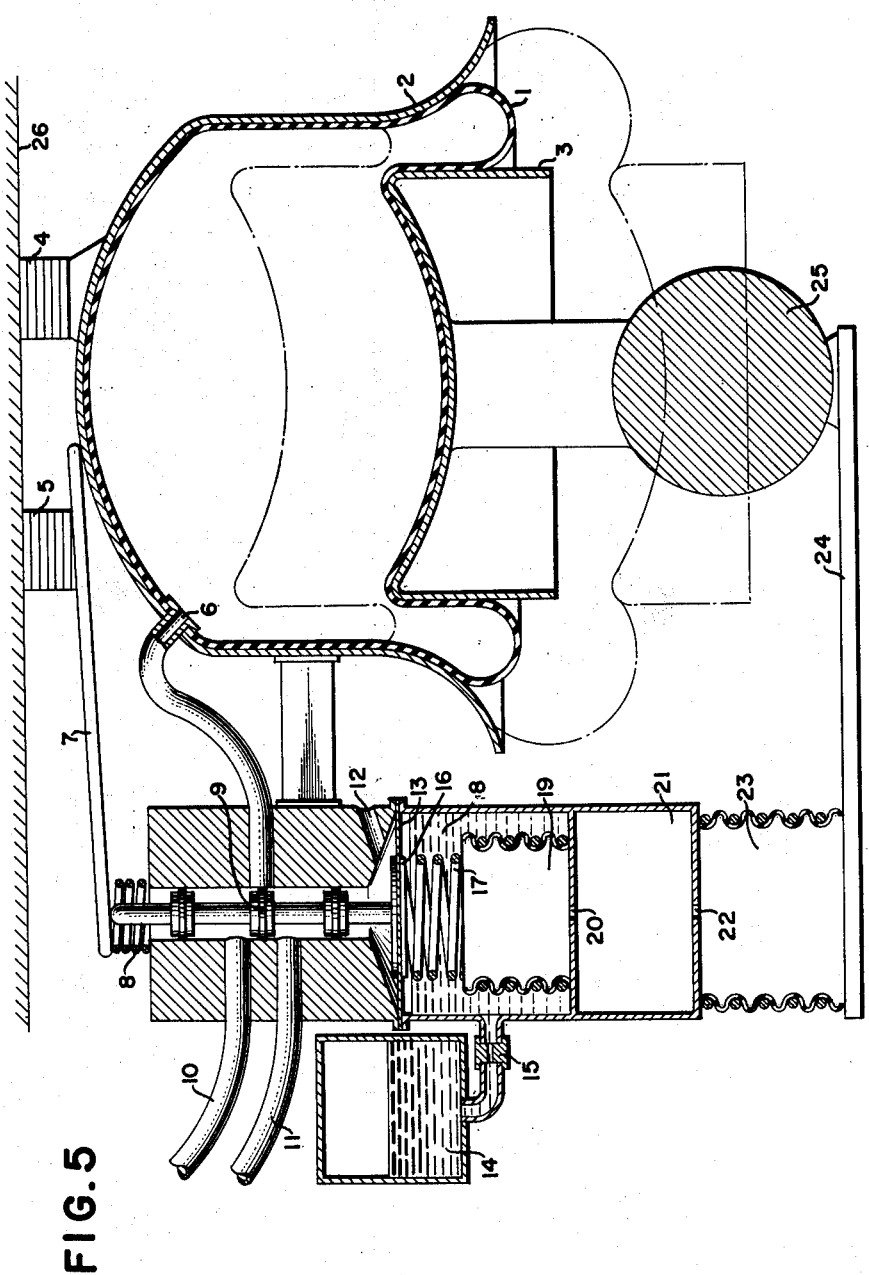

United States Patent Office

3,106,388
SUSPENSION INSENSITIVE TO BRIEF FORCE APPLICABLE TO VEHICLES AND ENGINE BEARERS
Armand de Callatay, 37 Rue J. de Lalaing, Brussels, Belgium
Filed Jan. 8, 1960, Ser. No. 6,582
Claims priority, application Belgium Jan. 26, 1959
2 Claims. (Cl. 267—65)

The ideal comfort of a vehicle is accomplished when it does not undergo any acceleration variation up and down. The lifting device set up between the wheels and the chassis acts in order to hold them apart. This force which is proportional to the vertical acceleration of the vehicle by the Newton law will have to be constant. In particular it will have to be independent of the relative motion of the wheels and the chassis.

Nevertheless, a device satisfying these conditions will not be adequate because of the two following causes:

If, for any reason, such as the wind or the friction in any wheel guiding system, the vehicle deviates from its equilibrium position; it will go on deviating at constant speed in the limits of its possible wheel clearance or ride clearance.

If the axial average profile or changes in elevation of the road is not a straight line, the vehicle will go on anyway following a straight line.

In order to correct these defects, it is not possible to add at the opportune moment, an elastic type force, because it would lose at this very moment the advantage of the constant lifting force against the chassis at normal wheel oscillation. But it is possible by giving only the indispensable vertical accelerations to modify the size of the sustentation force of the suspension device, keeping at the same time the property of being independent of the relative motion of wheels and chassis.

The object of this invention is a process of suspension composed of a device creating a lifting force which can be modified and independent of the relative position of the objects that the sustentation bounds, and of a device modifying the size of this astatic force in order to correct the above mentioned defects.

Referring to the drawings:

FIGURES 1 and 2 show diagrammatically the axial profiles of a road and the axial average probable profile.

FIGURE 3 shows diagrammatically an example of the axial profile of a road divided in portions of the same length.

FIGURE 4 shows diagrammatically the axial profile of a road and the trajectory of the motorcar.

FIGURE 5 is a vertical section of an embodiment of the invention.

We are now presenting the characteristics which must be satisfied by this regulating device.

If the car deviates from its straight trajectory, or if the road axial profile is curving, the car will deviate from the average axial road profile, and we may suppose, for a theoretical study, that this defect exists alone.

When speaking of the car trajectory we mean: trajectory of a point bound to the vehicle and at ground level when the vehicle is situated in the middle of the wheel clearance zone.

Let us assume the road axial profile as in FIG. 1; let us consider a thick curb in the shape of a deformable ribbon and whose thickness is the maximum wheels clearance at the scale of the road profile. Let us put this ribbon, in order to cover entirely the road profile, with the minimum curvatures. The vehicle will be able to follow the median line of this ribbon without ever being outside of wheel clearance. We shall name this median trajectory the average axial road profile.

The skidding tendency of a car is function of the friction the tires have on the ground, and this friction is proportional to the force which holds them on the ground; this force is equal, when one neglects the wheels and the not-suspended parts mass, to the sustentation force and thus at the vehicle vertical accelerations. A system made on the invention process will decrease at a minimum, therefore the skidding probability because it minimizes the vertical acceleration variations, and it will have an excellent influence on the roadability.

In order to trace at one place the average profile that we have defined, we had to know, not only the road profile by which the car went, but also by which the car will go. Such a result could be obtained by radars or other complicated devices.

A practical and simple realization requires that the average profile is drawn from the profile of the road before its being run by the vehicle. Let us determine the axial profile of a road interrupted suddenly in one point (see FIG. 2) and let us extend in this point the distorted ribbon in straight line; we obtain what we will call the axial average probable profile.

Let us assume that the motorcar follows a certain trajectory; the regulating system, determining at every instant the distance between the probable average profile and the trajectory of the motorcar and the relative angle of these two curves, will know sufficient elements to cause these two curves to incurve each other by the modification of the astatic force. We are going to take again one by one the points expressed in the last sentence beginning with the determination at each moment of the road probable profile.

We see by looking over road profile examples that we only have to retain the one associated to a limited passed time that we can divide (see FIG. 3) in proportions of same length and surfaces $S_1, S_2, \ldots S_n$. The average profile is then fixed by the formula:

$$a_1S_1 + a_2S_2 + \ldots + a_nS_n$$

where $a$ are given increasing values, or by any other formula which gives results coming near the first formula results. It is called "weighted mean."

An example: the electrical devices considered as filters, or the ones coming near filtrage properties, and equipped, if necessary, of an internal resistance to prevent any own vibration, are devices which compute "weighted" averages; that is true also of all the electromagnetic, mechanical, pneumatic, calorific, hydraulic, or combinations of these varied devices which are deducted from electrical devices, by the known analogy rules between vibrational devices.

When we know the relative height of the vehicle trajectory and of the probable axial average profile, we obtain immediately the angles that this profile forms with the vehicle trajectory by any speed measure device.

Let us consider on FIG. 4 the probable road average profile drawn in continuous dashes and the trajectory drawn in interrupted dashes. This trajectory is extended by a straight line $d$, at the time T that we consider. At that instant the relative deviation is $h$. The point C situated at constant distance from T determines the height CD. If the device is such that it modifies, for the vehicle at rest, the astatic force value of a quantity proportional to $h$, changed of sign, thus the two curves would converge toward each other (dotted curve A) but would cross each other, and it might occur endless oscillations.

But because we cannot use absorber shocks without affecting the fundamental properties of the suspension that exerts a force independent of the relative distance of the objects it bounds and of this variation speed of distance, we have to take into account the relative angle of the two curves.

If the device is such that it measures CD and modifies the astatic force value for the vehicle at rest of a quantity proportional to CD changed of sign, thus we have carried out a regulating system which will make the two curves converge toward each other (following the dotted curve B) in such a way that gives only the indispensable vertical accelerations, in regard to the above mentioned discussion, and with the assumption that the constitutive organs are of adequate dimension.

Let us note that we have drawn the construction represented in FIG. 4 to make understood the suspension function but that many analogous systems are possible.

The regulating device is generally formed of a system which performs the following function: to measure the distance between the objects that the suspension bounds, to determine a weighted average of these distances, to add to a quantity, increasing or decreasing with this weighted average, another quantity, increasing or decreasing with the speed variation of this weighted average or of another average, this last sum determines the value of the modification, which acts with opposite sign on the lifting force, with a certain delay, if necessary, this value being measured from the equilibrium position at rest.

The expression "increasing or decreasing with" means here that if one of the quantities increases, the other one does too, and inversely, this growth following any kind of law, even by steps or following a different law when increasing and decreasing.

It is obvious that the invention includes any system performing equivalent operations but in another succession, for example when taking the weighted average of a sum of increasing or decreasing quantities with the wheels position and the speed of the wheels position, or without the devices performing these operations being clearly materialized by isolated organs. It is clear that one does not change anything to the invention principle by adding system such as correction devices sensitive to acceleration, devices to keep constant the vehicle height for any load, devices anti-rolling, anti-pitching, anti-going on the side of the vehicle in the curves, anti-diving when braking, devices for raising automatically the wheel when the tire is flat, devices to modify the response speed with the vehicle speed or the bad repair of the road or any other device.

We have pointed out that it was practically impossible to maintain a vehicle on the road without giving corrective vertical accelerations. Consequently the accelerations which are caused by a weak flexibility or a weak damping may be without notice, that is to say not to be a size order superior to those which would occur by mean of the regulating system with a perfectly astatic lifting system on a normal and flat road and in normal use.

Therefore it may be advantageous to keep them for construction facilities, for optimum performance of the suspension, or for any other reason.

The suspension, object of the invention that we have explained here in the particular case of a motorcar on road, may be set up on each wheel, between an object bound to the wheel and an object bound to the chassis, on the understanding that it is the whole wheel-chassis binding which is astatic. It may be set up between the chassis and a bound object, for example by a lever or a levers system or any other system, to the displacement of two or several wheels. It is applicable with the explained characteristics at all motorcycle, motorcar, truck, bus, trailer, caterpillar vehicles, railroad vehicle, monorail vehicle, vehicle with skis or nautical skis, plane landing gear, this list not being limitative. It is applicable, under its characters, to bearers of semi-fixed machines, if one wants to avoid that the vibrations are transmitted to the ground; the lifting force transmitted by these suspensions has a minimum of oscillation.

Here are some accessory properties of this suspension:

(a) If we could recuperate the suspension energy and restitute at will the energy balance would be nearly equilibrated, because there is nowhere energy loss.

In the vehicles with ordinary suspension by spring and shock absorber, this last one takes energy from advancing kinetic energy. Even in the case we cannot recuperate the energy, the changements of the astatic force being reduced as much as possible, the energy expenses will be very small.

(b) It is not necessary, in view of the comfort, to use low pressure tires. The precision of the roadability will increase and the resistance to rolling will be decreased.

(c) This suspension does not resist to sudden variations of the centrifugal force. Thus it is useful to keep the stabilisation devices composed of a spring and a shock absorber acting on the relative wheel position of the left and right wheels, this not being obviously the only possible realization.

There is no interest in using a single suspension system on each wheel but one suspension alone acting by levers between the wheels of one axle or suspension systems with independently suspended wheels, the stabilization derived from the suspension system being used against the heaves.

(d) The same thing must be done to avoid diving of the vehicle but it is possible to avoid it by adopting incident angle of the wheels.

(e) The vibrations of the wheel itself are only absorbed by the resiliency of the tire and serves as inertial shock absorber for the wheels.

(f) The vehicle wheel clearance is no more fixed by flexibility characteristics, but by esthetical views and by the advantages of a low gravity centre. It is therefore possible to increase it.

We are showing now, and as an example, a practical realization.

It is evident that the suspension process described may be realized by a large number of combinations of devices known or to be discovered, and anyone who is skilled in the art of vibrations dampening devices knows that this may be realized indifferently by electrical, electromagnetic, pneumatic, hydraulic, calorific, mechanic systems or by combinations of those different systems.

The device that we will describe has been chosen because of its constructive simplicity and does not pretend in anyway to exhaust all the possibilities of the realization of the suspension process, object of the invention.

The varying astatic force is realized by a variable volume chamber holding compressible fluid such as air.

The volume variation of the chamber between the states $a$ and $b$ is bound to the wheel displacement $d$ which is the cause of this variation by the following formula:

$$V_b = V_a e^{Fd/C}$$

C being the pressure times the average volume, F is the astatic force and is modified by C, which itself is function of the pressure relative to the mean volume.

Exchanges of minimum energy require that the chamber size is in preference such as to realize the condition $$pv = Fd/1000$$

where $p$ is in kg./cm.$^2$, $v$ in liters, F in kg., $d$ in cm., these quantities being taken at coexistent values of $p$, $v$, F and maximum value of $d$.

The variation of the chamber volume is obtained (FIG. 5) by a diaphragm I in elastic material, as rubber, which is held in a cup 2, while another cup 3 goes inside, the cups being shaped to satisfy the above formula, realizing thus the exponential relation between the volumes and the wheel position, this form has been chosen to use a diaphragm, but many other shapes may be used to realize approximatively the exponential relations. This device is set up between the axle 25 of the wheel or what is used instead in the suspension with independent wheels and the chassis 26.

This diaphragm is filled in compressible gas such as air by the tube 6. The wheels are guided by any steering device.

The regulating system has a body fixed on the cup 2. The axle 25 compressed by its movement transmitted by the arm lever 24 a chamber 23 filled with a compressible fluid such as air or nitrogen. This chamber is limited by a membrane in elastic material, such as rubber and pleated. The gas of the chamber 23 may be forced or exhausted by the narrow hole 22 in the chamber 21 of fixed size. The gas of this last one being able then to go by the narrow hole 20 in the chamber 19 analogous to the chamber 23.

In consequence of this device, the movement of the chamber 19 bottom will be weighted mean of the movement of the chamber 23 bottom.

The chamber 19 is in the chamber 17 filled by a liquid such as oil, which can escape by the jet 15 into the reservoir 14. The pressure in the liquid will be function of speed when going through the jet, thus of the speed of the chamber 19 bottom.

The bottom of the chamber 19 acts by the spring 18 on the membrane 13; the oil pressure acts by intermediary of an air cushion 16 at the top of the chamber 17, and which is used to ameliorate the weighted mean also on the membrane 13.

On the membrane 13 will act therefore a quantity function of the weighted mean, plus a quantity function of variation speed of the weighted mean.

The force upon the membrane 13 is compared to the astatic force of the suspension by the lever 7, which takes a fraction of this force. For the astatic force is divided between the block 4 in elastic material such as rubber and the contact zone of 7 and 2. The lever is articulated on the block 5 analogous to the block 4. A spring 8, not indispensable, allows to maintain the chambers 23, 21 and 19 at an average pressure equal to the atmosphere pressure and thus to reduce, if necessary, the probability to have gas leaks in this system. Let us note that if we modify the tension of the spring 8, we realized a correction of the height of the vehicle above ground level.

The movement of the valve 9 will depend on two antagonistic forces 7 and 13. It is easily understood that if the axle goes down on a prolongated period, or if the force transmitted by the suspension increases, the valve 9 will go down, allowing to the conduit 10 of low pressure, such as the atmosphere pressure to be in communication with the diaphragm. This conduit 10 may be, for instance, in communication with the muffler. In the other case the effect will be reversed: the conduit 11, which is in communicaton with compressed air or gas source, such as a compressor or a pressure reservoir in communication with a compressor will fill the suspension diaphragm.

The conduit 12 is a conduit to allow the pressure to be equal to the atmosphere pressure because of the valve leaks.

The lever 7, which is pivoted about the elastic block 5 is subjected to two opposing forces which act on its ends. The cup 2, under the effect of the pressure in the diaphragm 1, has a tendency to rise. The force which it exerts passes through the axis of symmetry of the diaphragm. This force is balanced on the one hand by the elastic block 4 and on the other hand by one end of the lever 7. Since the profile of the cup 2 is designed so as to transmit an elastic force, it can be seen that the force which acts on this side of the lever 7 is proportional to said elastic force. On the other side of the lever 7, the force is transmitted by the valve 9 and is proportional to the force on the diaphragm 13. The lever 7 turns around the elastic block 5 whenever the equilibrium between these forces is destroyed.

*Operation*

When the axle 25 moves away from the chasis 26, the force transmitted by the diaphragm 2 remains unchanged and the lever 7 therefore does not immediately move. This movement of the axle 25 expands the chamber 23 due to the connection therebetween of the lever 24. Expansion of the chamber 23 reduces the pressure therein and causes movement of air from the chamber 21 into the chamber 23 and from the chamber 19 into the chamber 21. The reduction of pressure within the chamber 19 correspondingly increases the tension on the spring 17 and reduces the volume of bellows chamber 19. The spring 17 exerts zero pressure when chamber 19 is under atmospheric pressure; when chamber 19 is at a pressure less than atmospheric, the spring pulls on chamber 19, the spring being under tension. The force exerted by lever 7 is counterbalanced by spring 8.

As was previously stated, when the axle 25 moves away from the chassis 26, the force transmitted by the diaphragm 1 remains unchanged. This is true whether the axle moves away from, or towards, the chassis. When the axle 25 moves toward the chassis 26, the pressure within the chamber 1 increases but the active surface (equivalent to that of a piston) decreases. The surface multiplied by the pressure which gives the total force remains practically constant and therefore the force applied by the cup 2 and the lever 7 remains constant. Conversely, when the axle moves downwardly, the pressure of the gas actually decreases but the equivalent surface of the piston increases and the produce (pressure × surface) remains unchanged.

Since the oil in the chamber 18 is noncompressible, reduction of the size of the chamber 19 will cause oil to be introduced into the chamber 18 from the reservoir 14 through the jet 15. The pressure of the oil in the chamber 18, and hence of the air cushion 16, will be proportional to the speed of introduction of the oil, i.e., proportional to the average speed with which axle 25 moves away from the chassis 26. Since the chamber 19 is reduced in size, the spring 17 will be under tension. The spring 17 therefore transmits to the diaphragm 14 a force proportional to the average distance away from the axle 25. At this time, the pressure on the diaphragm is reduced due to the decrease in oil pressure and decrease in the tension in the spring. The equilibrium of the forces on the lever 7 is therefore destroyed since the elastic force exerted by the cup 2 has still not changed. Consequently, the valve 9 descends and connects the conduit 10 to the conduit 6. Air emerges from the diaphragm through these conduits and the elastic force is consequently decreased. After a certain period of time, the equilibrium of the lever 7 is re-established and the valve 9 again closes. Since the elastic force which supports the chassis 26 has been decreased, the chassis descends and returns to its equilibrium position. The movements of the various parts are reversed when the axle 25 moves toward the chassis 26.

This device may be set up without modification between the chassis and a piece which moves proportionally to the wheels movement, and, for all the applications that we have mentioned, it can be set up without modification between the objects in relative motion; in particular it can be set up between the frame of a machine and the ground at all places where there are bearers.

I claim:

1. A device for controlling the movement of two members relatively movable with respect to each other, the relative distances between said members varying only between two limits and the variations of transmitted forces being the smallest possible, said device comprising a pneumatic expansible chamber interposed between the two members, a control device also interposed between said two members and comprising expansible and contractible means divided into multiple chambers and including two bellows chambers between which is interposed a chamber of fixed volume, openings being provided between said bellows chambers and said intermediate fixed chamber, a chamber embodied in said control device containing hydraulic fluid and surrounding a first one of said bellows chambers, said first bellows chamber being located at one end of said hydraulic fluid chamber, a diaphragm in said hydraulic fluid chamber at the end opposite said first bellows chamber, a spring device interposed between said first bellows and said diaphragm, a rigid connection between one of said members and a second one of said bellows chambers, a reservoir connected to said hydraulic fluid chamber by means of a restricted jet whereby variation in volume of said last named bellows effected by movement between the members exerts varying pressure upon said diaphragm, means for supplying pneumatic fluid to said expansible chamber, said last named means including a valve actuated by said diaphragm, an articulated lever having one end operatively connected with said valve and having a portion thereof connected through an elastic support to one of said members, the other end of the lever being operatively connected to said expansible chamber such that the differences between the astatic force transmitted by said lever to said valve and that transmitted by the diaphragm effect the opening and closing of the valve means for inflating or deflating said expansible chamber.

2. A device for controlling the movement of two members relatively movable with respect to each other, the relative distances between said members varying only between two limits and the variations of transmitted forces being the smallest possible, said device comprising a pneumatic expansible chamber interposed between the two members, a control device also interposed between said two members and comprising expansible and contractible means divided into mutiple chambers and including two bellows chambers between which is interposed a chamber of fixed volume, jet openings being provided betwen said bellows chambers and said intermediate fixed chamber, a chamber embodied in said control device containing hydraulic fluid and surrounding a first one of said bellows chambers, said first bellows chamber being located at one end of said hydraulic fluid chamber, a diaphragm in said hydraulic fluid chamber at the end opposite said first bellows chamber, a spring device interposed between said first bellows and said diaphragm, a rigid connection between one of said members and a second one of said bellows chambers, a reservoir connected to said hydraulic fluid chamber by means of a restricted jet whereby variation in volume of said last named bellows effected by movement between the members exerts varying pressure upon said diaphragm, an air cushion between said hydraulic fluid and said diaphragm, means for supplying pneumatic fluid to said expansible chamber, said last named means including a valve actuated by said diaphragm, an articulated lever having one end operatively connected with said valve and having a portion thereof connected through an elastic support to one of said members, the other end of the lever being operatively connected to said expansible chamber such that the differences between the astatic force transmitted by said lever to said valve and that transmitted by the diaphragm effect the opening and closing of the valve means for inflating or deflating said expansible chamber.

References Cited in the file of this patent
UNITED STATES PATENTS

| | | |
|---|---|---|
| 1,641,640 | Myers | Sept. 6, 1927 |
| 2,021,043 | Bedford et al. | Nov. 12, 1935 |
| 2,208,537 | Brown | July 16, 1940 |
| 2,212,426 | Mitereff | Aug. 20, 1940 |
| 2,492,990 | Hanna | Jan. 3, 1950 |
| 2,908,508 | Brunsdon et al. | Oct. 13, 1959 |
| 2,977,134 | Helling | Mar. 28, 1961 |